Patented Oct. 18, 1949

2,485,043

UNITED STATES PATENT OFFICE 2,485,043

NONSTARCH DESSERT COMPOSITION

François Gatti, Spiegel-Berne, Switzerland, assignor to Gabriel Fabre, New York, N. Y.

No Drawing. Application December 7, 1948,
Serial No. 64,049

4 Claims. (Cl. 99—139)

This invention relates to a non-starch dessert composition and particularly to one for making a set custard type of product.

The composition has an agar-agar base. When mixed with milk and the resulting mix boiled and allowed to cool, it sets up to form suitable for use.

In making agar-agar desserts with milk and without starches the agar-agar frequently curdles the milk. For this reason, agar-agar desserts heretofore used have been made either with starch or with water, fruit juice, or liquid other than milk. I have now discovered that I avoid this curdling by the use, with the agar-agar, even in the absence of starch, of a combination of dextrose and sodium bicarbonate. Neither the sodium bicarbonate nor the dextrose alone is able to overcome the curdling which otherwise ensues when the agar-agar composition is mixed with the milk and the whole heated.

Briefly stated, the invention comprises a dessert composition including agar-agar, dextrose, sodium bicarbonate, and flavoring and coloring materials if any to suit the taste. For most uses of the composition I add sucrose in the form of ordinary sugar in addition to the dextrose.

Using a mixture of 5.5 g. of agar-agar, 1 of sodium bicarbonate, and 110 of granulated cane sugar, stirring this composition into a quart of milk, and then heating the milk to boiling for 3 minutes, curdling of the milk resulted in 4 out of 10 or 40% of the cases, half of the ten preparations being made with raw and half with pasteurized milk. With the same technique and the same composition except for the admixing initially of 10 g. of dextrose, there was not a single instance of curdling in ten trials. With 5.5 g. agar-agar and 110 of sugar, with no bicarbonate and no dextrose, curdling occurred in 10 out of 10 tests.

While details of the mechanism of reaction by which the dextrose in association with sodium bicarbonate prevents curdling of the milk are not known to me, I consider the effect to be due in part to the activity of the aldehyde group in dextrose which is greater than the activity of any reducing group in sucrose.

The agar-agar used is the United States commercial grade of granulated or pulverized agar-agar approved for use in foods.

The dextrose may be either granulated or pulverized. The sodium bicarbonate is the common commercial material such as used in baking soda. In place of it, there may be used an equivalent weight of potassium bicarbonate or other soluble, non-toxic, weak, fixed alkali such as sodium carbonate.

The sugar when used is a usual granulated or pulverized cane or beet sugar.

An example of flavoring material that may be used is vanilla or vanillin, chocolate, coffee or the like.

As coloring material I may use any coloring commonly employed in foods, as, for instance, powdered egg yolk, the coloring material approved for use in oleomargarine, raspberry coloring, or the like.

The selected materials are intimately mixed as in a drum mixer and then packaged ready for use. Preferably I place in each package sufficient of the material to make the set custard with a measured quantity of milk, as, for instance, the proper quantity for a quart or for a pint of milk.

As to proportions, it is important that the dextrose be in excess of the proportion of agar-agar, also that the sodium bicarbonate used be present in the proportion of at least 15% of the weight of the agar-agar.

Proportions that are satisfactory are shown in the following table.

| Ingredient: | Parts |
| --- | --- |
| Agar-agar | 100 |
| Dextrose | 150–2500 |
| Sodium bicarbonate | 15–40 |
| Sugar (sucrose) | 0–2350 |

For best results there are used at least 100 parts of sucrose and the proportions of dextrose and sugar are selected, within the ranges stated, to give 1500 to 2500 parts of total sugars for 100 of agar-agar.

Minor ingredients that may be used are incorporated in usual proportions to give flavor or taste to suit the user. Thus there may be used salt 5 parts, vanilla 5, and egg coloring 4, for 100 of agar-agar.

The proportions above and elsewhere herein are expressed as parts by weight.

With respect to the proportion of dextrose and sugar in the table given above, it is to be noted that all of the sugar (sucrose) may be replaced by the dextrose. It is not possible, on the other hand, to replace all of the dextrose by sugar without introducing curdling of the milk during the making of the finished custard. In other words, there must be present a minimum proportion of the dextrose. If the dextrose in the minimum proportion is not used, then there is curdling of the milk during making of the hot solution in milk previous to table use of the composition. The purpose of adding sugar as well as dextrose is to establish the sucrose taste when desired in the finished dessert.

The invention will be further illustrated by description in connection with the following specific example of the practice of it.

Example

My dessert powder in quantity for dissolving in 1 quart of milk is made as follows:

| | Grams |
|---|---|
| Agar-agar powder | 5.5 |
| Dextrose (Cerelose) | 10 |
| Sodium bicarbonate | 1 |
| Cane sugar, granulated | 110 |
| Salt | 0.25 |
| Vanilla powder | 6 |
| Coloring | 4 |
| Total | 136.75 |

The ingredients in the amounts shown are thoroughly mixed until uniform.

The milk used is either raw, pasteurized, or boiled in advance. Milk of any grade as to previous heat treatment or absence of the heat treatment is satisfactory.

The composition made as above and containing 5.5 grams of the agar-agar is mixed with the milk, either hot or cold, but in any case the milk is raised to the boiling point and maintained at about that temperature in contact with the composition for three minutes or until the last of the composition is dissolved. Then the whole is poured into molds and allowed to cool until set.

The result is a smooth, creamy mass similar to what is commonly called "pot-de-crème."

There is no curdling of the milk during the preparation and the product after as well as before setting is free from lumps.

In making other flavors, there may be substituted the flavoring materials commonly used in making custards and desserts. Also there may be used other approved coloring materials, all in accordance with the choice of the user.

The finished product after dissolving in the milk is a non-starch dessert similar to the class of desserts previously known which required starch to prevent curdling of the milk.

It will be understood that it is intended to cover all changes and modifications of the examples of the invention herein chosen for the purpose of illustration which do not constitute departures from the spirit and scope of the invention.

What I claim is:

1. A non-starch dessert composition, free of curdling effect on hot milk, comprising agar-agar, dextrose, and sodium bicarbonate, the dextrose being present in amount in excess of the agar-agar and the sodium bicarbonate in the proportion of 15 to 40 parts for 100 of the agar-agar.

2. A non-starch dessert composition, free of curdling effect on hot milk, comprising agar-agar, dextrose, sugar, and a water-soluble, weak, fixed alkali, the alkali being present in the proportion of 15 to 40 parts, the dextrose at least 150 parts, and the dextrose and sugar together being within the range 1500 to 2500 parts for 100 of the agar-agar.

3. A composition as described in claim 1, the proportion of dextrose being 150 to 2500 parts for 100 parts of the agar-agar.

4. A non-starch dessert comprising milk and agar-agar, dextrose and sodium bicarbonate dispersed in the milk, the dessert being in set condition, the proportion of dextrose being in excess of the proportion of agar-agar and the sodium bicarbonate being present in the proportion of at least 15 parts for 100 of the agar-agar.

FRANÇOIS GATTI.

REFERENCES CITED

The following references are of record in the file of this patent:

UNITED STATES PATENTS

| Number | Name | Date |
|---|---|---|
| 1,643,951 | Leo | Oct. 4, 1927 |
| 2,369,846 | Olsen et al. | Feb. 20, 1945 |

FOREIGN PATENTS

| Number | Country | Date |
|---|---|---|
| 11,392 | Great Britain | 1907 |